United States Patent [19]

Wolfberg et al.

[11] 3,948,126

[45] Apr. 6, 1976

[54] CROSS PERFORATING OF CONTINUOUSLY MOVING, SUPERIMPOSED LEAVES

[75] Inventors: Larry B. Wolfberg; John Harper, both of Wichita, Kans.

[73] Assignee: Service Business Forms, Inc., Wichita, Kans.

[22] Filed: Dec. 11, 1974

[21] Appl. No.: 531,779

Related U.S. Application Data

[60] Division of Ser. No. 309,128, Nov. 24, 1972, Pat. No. 3,866,497, which is a continuation-in-part of Ser. No. 210,124, Dec. 20, 1971, which is a continuation of Ser. No. 882,256, Dec. 4, 1969, abandoned.

[52] U.S. Cl. .......................... 83/37; 83/346; 83/343; 83/300; 83/303

[51] Int. Cl.² ...................... B23D 25/08; B26D 1/56

[58] Field of Search ............. 83/303, 346, 304, 678, 83/343, 300, 37, 30, 331

[56] References Cited

UNITED STATES PATENTS

| | | | |
|---|---|---|---|
| 1,939,196 | 12/1933 | Barber | 83/303 |
| 3,182,540 | 5/1965 | Eichorn et al. | 83/346 |

*Primary Examiner*—Donald R. Schran
*Attorney, Agent, or Firm*—Schmidt, Johnson, Hovey & Williams

[57] ABSTRACT

A method and apparatus of producing continuous, cross-perforated, snap-out business forms and the like consisting of a plurality of properly aligned, superimposed sheets in which the interval between crossperforation lines may be varied with a minimum of "down-time" to provide business forms of diverse sizes while maintaining a uniform fold interval for stacking the continuous sheets one on top of the other into a pack.

3 Claims, 11 Drawing Figures

Fig. 8.
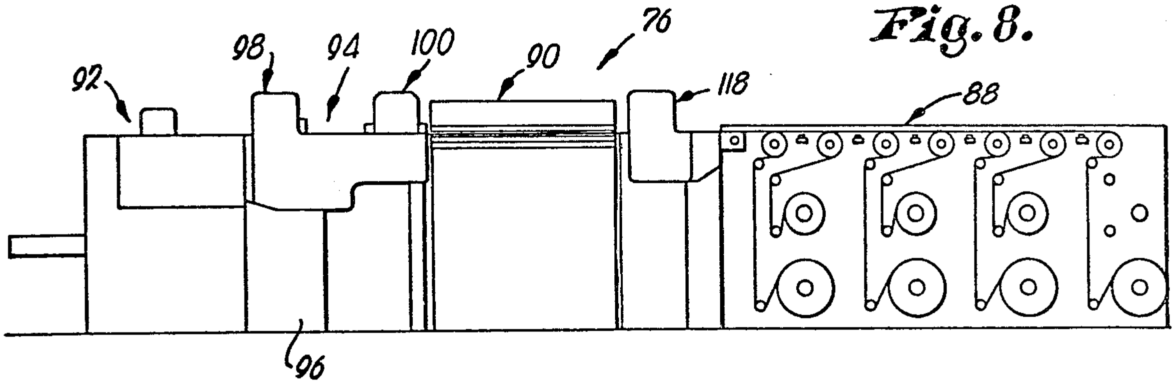
Fig. 9.
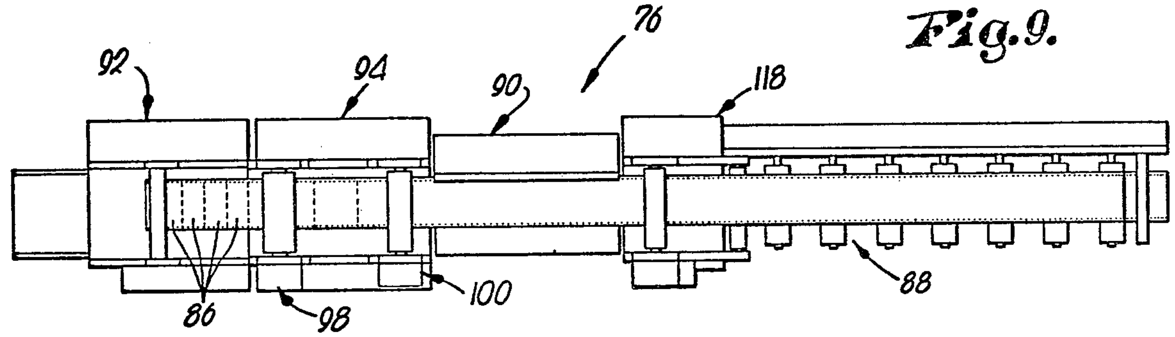
Fig. 10.
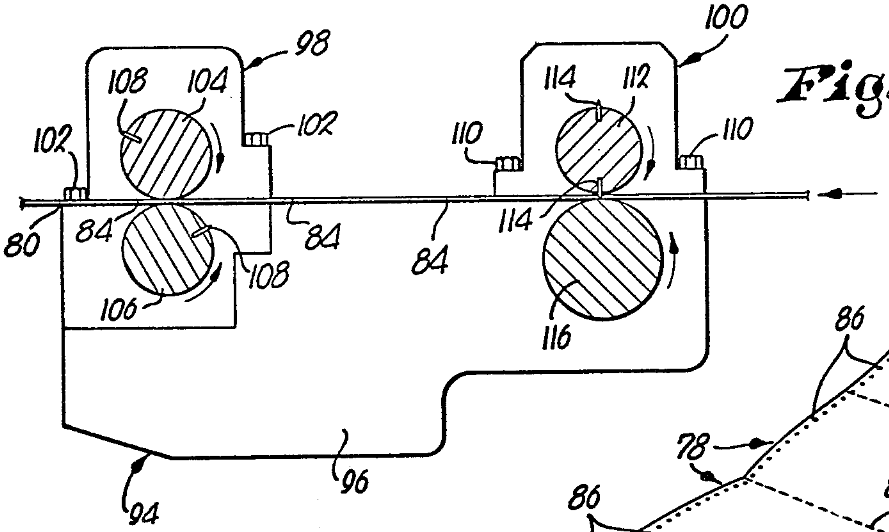
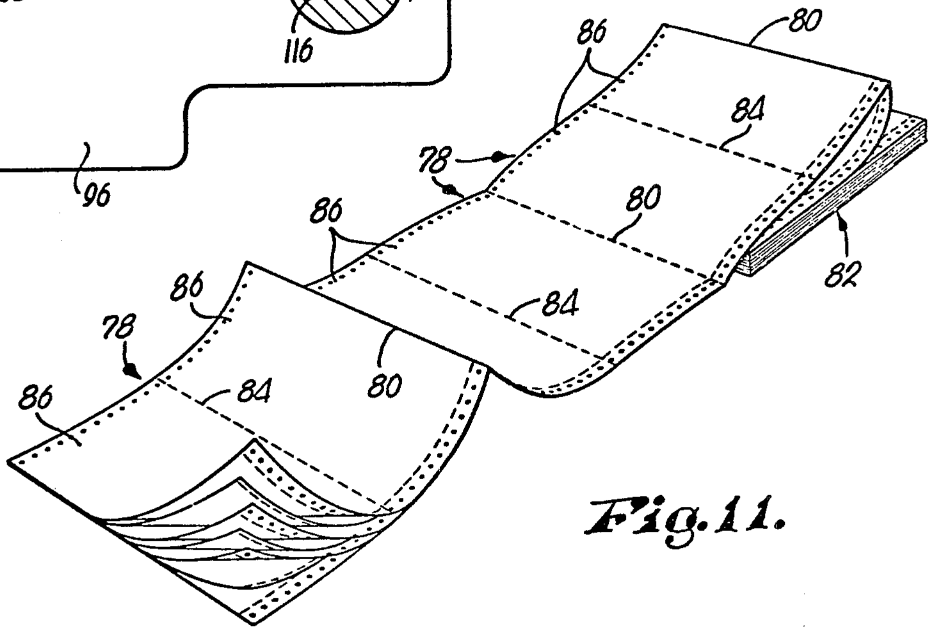
Fig. 11.

CROSS PERFORATING OF CONTINUOUSLY MOVING, SUPERIMPOSED LEAVES

CROSS-REFERENCES

This is a division of application Ser. No. 309,128 filed on Nov. 24, 1972, now U.S. Pat. No. 3,866,497, which is a continuation-in-part of our copending application Ser. No. 210,124, filed Dec. 20, 1971, and entitled "Glue Fastening Of Superimposed Leaves", said copending application itself being a continuation of prior copending application by the same title, Ser. No. 882,256, filed Dec. 4, 1969, now abandoned.

In the manufacture of continuous business forms and the like it is extremely important that they be capable of use in automatic, computerized printers and other machines without creating any difficulty such as jamming, damage to the forms, malfunction of the machines or other problems. This necessitates high perfection in the production of the multilayered units whether in the nature of sheets or leaves used as business forms, stationary or otherwise.

By far the most difficult problem is in the line gluing of the sheets together. First of all, there must not be any undue bulkiness at the zone of the glue line. Secondly, the increase in thickness necessitated by the presence of the glue must be uniform and minimal. Thirdly, the glue line must be continuous in absence of spaces therealong where complete interconnection of the sheets cannot be effected. Fourthly, the interconnection must not give way and permit separation of the sheets at any point along the glue line either during production, or during storage and shipment, or during use in printing machines or other equipment.

Conventionally, both the so-called hot and cold glues have been used for this purpose, including both animal and dextrin solutions. And various heating methods have been tried, including infrared thermal radiation to evaporate the liquid content of the glue and to, therefore, effect drying. But, except in cases of rather expensive, slow procedures, no prior method has been entirely successful regardless of the type of glue or heating methods employed.

Particularly aggravating has been the problem known as "tenting" and the problem of build-up bulk caused by the line of glue. The continuous, multicopy sheets to which the present invention relates are folded transversely at equally spaced intervals to present a finished pack which cannot only be conveniently stored and shipped but which will automatically unfold as the same is fed to computerized printers, typewriters and other machines. Defective gluing results in separation of the sheets at each line of fold, forming a small triangular bulge known as a tent. Such condition cannot be tolerated primarily because of malfunction in the aforementioned machines with which the forms and the like are ultimately used.

Still another problem in the assembly and fastening of a number of continuous leaves of paper for use as above explained relates to maintaining the sheets in proper alignment. Consequently, each layer must be rather perfectly aligned, edge-to-edge, with proximal sheets thereabove and therebelow so that all material printed or typed on the original will be reproduced on the copies, by the effect of interleaved carbon, mechanical or chemical self-contained reproducing paper, in substantially the same location marginally as well as top to bottom. Conventional methods of assembly and interconnection of such continuous, superimposed leaves or sheets of paper through use of glue have not always solved this problem to the complete satisfaction of all users.

An additional problem in the production of a number of continuous leaves of paper which are cross-perforated at preselected intervals to facilitate transverse folding to produce a pack, is not directly related to the gluing, fastening and alignment problems above set forth but is instead, related to the difficulties produced as a result of diverse customer demands. In this regard, depending upon the ultimate use to which the prepared sheets will be placed, the distance between adjacent transverse perforations in the sheets may vary substantially. For example, if the continuous sheets are to be used in connection with computerized printers and the like, the distance between perforation lines may be on the order of 11 inches with the interconnected sections remaining connected until the print-out is completed, whereupon the final section of the print-out is snapped free of the next adjacent, unprinted section along a perforated fold line.

On the other hand, where the continuous sheets are to be used in various types of business forms which may often be 3⅔ or 5½ inches in length, there is a need to produce the perforation lines at much smaller intervals to allow the individual forms to be separated from one another. In both instances, even though the articles themselves may be 3⅔, 5½, or 11 inches in length, it is beneficial from a storing and handling standpoint to fold the sheets at common intervals such as 11 inches so that, in the case of the shorter forms, two or more of the forms may appear in each layer of the pack of sheets produced when the sheets are folded in opposite directions at 11 inch intervals. For purposes of clarity throughout the description hereinbelow set forth, in order to distinguish between the lines along which the sections are folded from the perforation lines intermediate the fold lines, the perforations which define the folding points will be referred to as "perforation fold lines", while those perforations intermediate the fold lines will be referred to as "perforation tear lines", although it is to be understood that the sheets may, in fact, be torn along any of such perforation lines and, in most cases, the fold lines will have perforations identical in character to one another.

Moreover, the user often needs sheets which are folded at other than 11 inch intervals such as, for example, 7, 8½, 12 or 14 inch intervals to satisfy his particular requirements. Each of these latter intervals may be further subdivided to produce a multitude of sizes which the individual articles or sections may assume.

Because of the many diverse lengths of articles which may be required from time to time, a certain amount of down-time is necessarily involved in order to modify the working components of the production apparatus to produce a product having the perforation characteristics desired by one user in lieu of those characteristics desired by another user. Ideally, such down-time should be maintained at a minimum since the amount of time that the production apparatus stands idle directly affects the total amount of job time for a particular order as well as the overall operating efficiency of the apparatus.

Accordingly, one important object of the present invention is to provide a highly flexible system of cross-perforating continuous, superimposed leaves or sheets in order to accommodate widely diversified user demands in terms of article size and fold lengths, all without sacrificing high quality and precision associated with the products fabricated in accordance with the gluing process incident to the production of the product.

Another important object of the present invention is to provide a flexible perforating system as above set forth wherein the perforation lines which serve as fold lines for the continuous sheets are alternately produced from opposite directions so that the sheets themselves may be readily folded in opposite directions at the fold lines to produce a pack formed without "back folding" on any of the fold lines. Back folds are caused when alternate fold lines are produced from the same direction and the individual sections of sheets are folded back over one another to produce the pack so that every other fold line "goes against the grain" of the perforations defining such lines.

A further important object of the instant invention is to provide a cross-perforating system of high flexibility wherein one perforating head may be used continuously for a normal production run having a predetermined fold line interval for the sheets processed by the perforating head, while another perforating head used for producing intermediate tear line cross-perforations between the fold line perforations may be maintained in a standby or idle condition during the normal production run until a modified run requiring a selected number of such tear lines between the fold lines is required.

Yet another important object of our invention is to provide a cross-perforating system as aforesaid wherein the individual perforating heads of the system may be readily removed and replaced with new heads which are capable of producing fold lines and tear lines intermediate the fold lines at spaced intervals which differ substantially from those possible with the replaced perforating heads.

Other objects and aims will be made clear to become apparent as the following specification progresses, reference being had to the accompanying drawing, wherein:

FIG. 8 is a schematic, side elevational view similar to FIG. 1 of apparatus capable of use in carrying out the method of cross-perforation of superimposed leaves in accordance with the concepts of our present invention;

FIG. 9 is a schematic, top plan view of the apparatus illustrated in FIG. 8;

FIG. 10 is an enlarged, fragmentary, schematic side elevational view of the perforating apparatus illustrating the two perforating heads thereof; and FIG. 11 is a perspective view similar to FIG. 3 of a pack of continuous business forms or the like illustrating the provision of intermediate perforation tear lines between pairs of the perforation fold lines.

DESCRIPTION OF FIGS. 1–7

Figure 1:
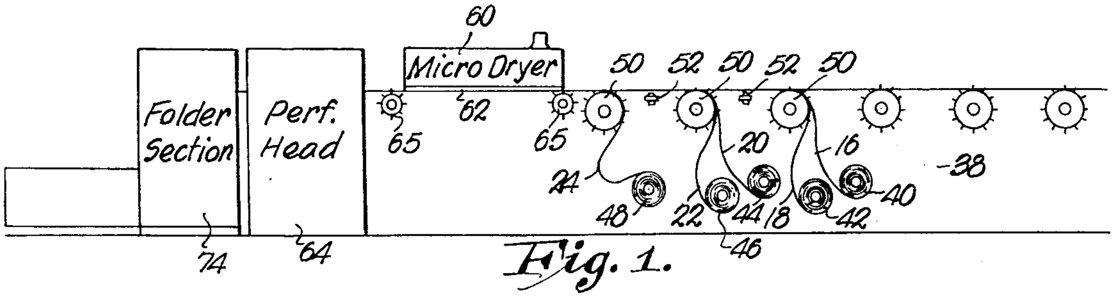
FIG. 1 is a schematic, side elevational view of equipment capable of use in carrying out the method of glue fastening of superimposed leaves hereinbelow set forth.

For convenience, the method hereinafter described in connection with FIGS. 1–7 will be illustrated in conjunction with the production of a pack 10 of continuous business forms 12 having equally spaced transverse lines of perforation 14, and especially adapted for use in computerized or data-processing printers and other comparable equipment. It is to be understood, however, that such terminology does not preclude advantageous use of our method in connection with the glue fastening of superimposed leaves or sheets of paper having various other uses, including, therefore, stationery and other products.

The form chosen for illustration of our production method, broadly designated by the numeral 12 as aforesaid, includes a top sheet or leaf of paper 16, a sheet of carbon paper 18 attached to the sheet 16 therebelow, a second sheet of paper 20 beneath the carbon 18, a second sheet of carbon paper 22 beneath the sheet 20 and attached thereto, and a third or bottom sheet of paper 24 beneath the carbon 22. It is to be understood, however, that in accordance with the method about to be described, the forms 12 may consist of any number of additional sheets as at 16, 20 and 24 with a corresponding number of carbons as at 18 and 22. Moreover, it is not necessary that the pack 10 include the carbons 18 and 22, or any carbons, as in the case of self-contained reproducing paper.

Figure 5:
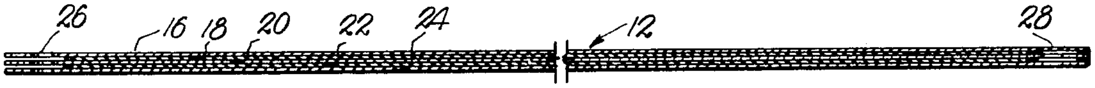
FIG. 5 is a transverse cross-sectional view through the forms illustrated in FIG. 3.
Figure 4:
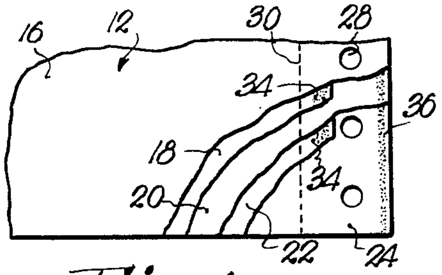
FIG. 4 is a fragmentary, top plan view of the forms shown in FIG. 3, the aforementioned corner being broken away for clearness.
Figure 3:
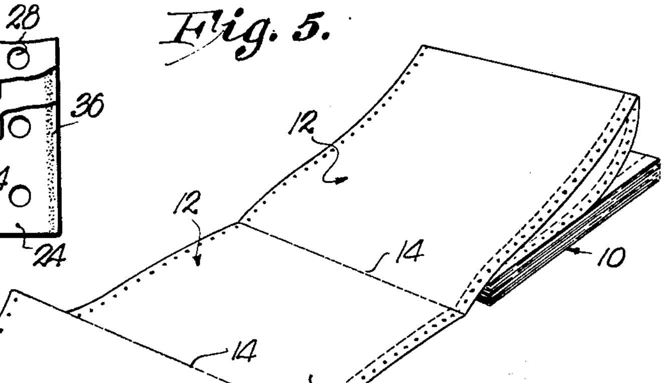
FIG. 3 is a perspective view of a pack of continuous business forms or the like, partially unfolded and with one corner pulled back for illustrating certain details of construction.
Figure 3:
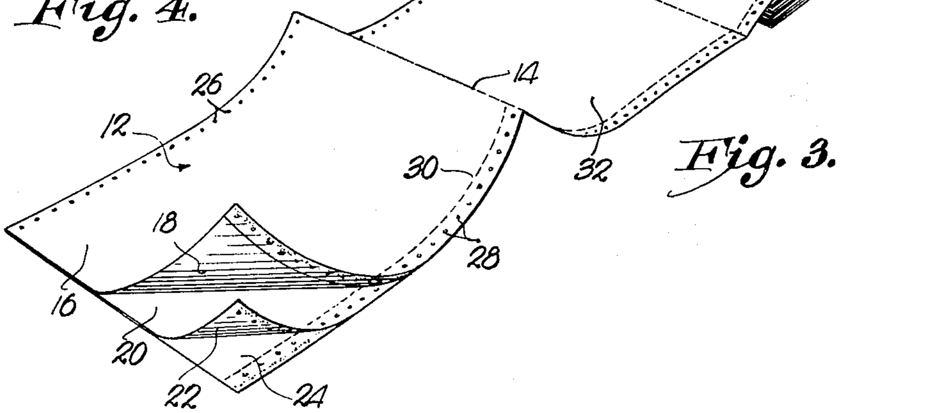

Moreover, the product shown in FIGS. 3, 4 and 5 may have rows of holes or openings 26 and 28 adjacent the longitudinal edges of the sheets 16, 20 and 24, but since the carbons 18 and 22 do not extend the full width of the sheets 16, 20, and 24, the holes 26 and 28 do not pass through the carbon paper.

Furthermore, the product chosen for illustration is provided with a longitudinal line of perforations 30 which pass through all of the sheets 16, 18, 20, 22 and 24, presenting a marginal stub 32 which may be snapped away after processing through the printer, thereby separating all of the sheets 16, 18, 20, 22 and 24, and permitting desired distribution of the individual sheets 16, 20 and 24 when the same are torn apart along the lines of perforation 14.

To this end, therefore, the carbons 18 and 22 are attached to their corresponding sheets 16 and 20 respectively by longitudinal lines of glue 34 within the stub portions 32, i.e., outwardly of but adjacent the line of perforation 30. On the other hand, the sheet 16 is fastened to the sheet 20, and the sheet 20 is fastened to the sheet 24 by glue lines 36 extending continuously throughout the length of the stub 32 adjacent the outermost longitudinal edge thereof with the holes or openings 28 located between the glue lines 34 and 36.

Figure 2:
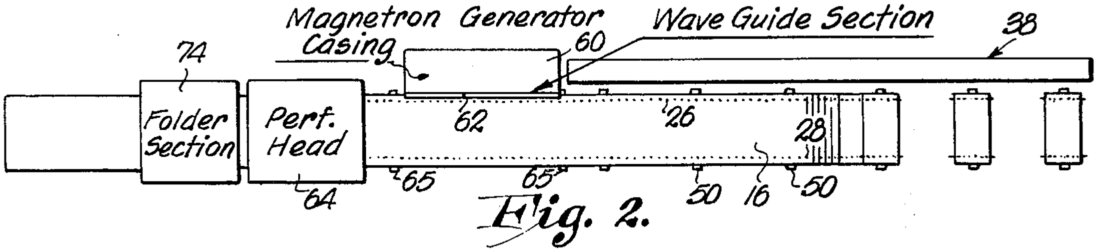
FIG. 2 is a schematic top plan view of the equipment illustrated in FIG. 1.

In FIGS. 1 and 2 of the drawing, a collator broadly designated by the numeral 38 supports supply drums 40, 42, 44, 46 and 48 for the continuous sheets or leaves 16, 18, 20, 22 and 24 which are advanced horizontally (from right to left viewing FIGS. 1 and 2), to place such sheets in superimposed relationship, by rotatable drive rollers 50 which may or may not have radial pins at their peripheries for receiving the holes 26 and 28 of the sheets 16, 20 and 24.

Figure 7:
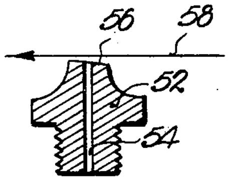
FIG. 7 is a cross-sectional view through one of the nozzles employed in the equipment shown by FIGS. 1 and 2 for depositing a line of glue onto the sheets as they are advanced through the collator.

Collator 38 is equipped with a number of special nozzles 52 for depositing a line of glue on the sheets during their advancement. Such nozzles 52 are preferably formed from a nonoxidizing, malleable or nonmalleable material capable of receiving copies of required dimensions, as illustrated in FIG. 7 in the drawing. It is extremely important that the nozzle 52 direct a very fine stream of glue to the sheets, and we have been particularly successful in carrying out our method by the selection of an orifice 54 for the nozzles 52 that has a size in the order of from 0.005 to 0.0937 inches.

Moreover, in order to cause the glue to rise and string out before reaching the sheets, thus forming narrower glue lines 36 of minimum thickness than is made possible by a standard nozzle, we have cut the head 56 of the nozzle 52 at an angle of approximately 5°, the sheets traveling with respect to the head 56 in the direction of arrow 58 in FIG. 7.

We have found that the so-called hot glues universally used in many applications within this field are not entirely satisfactory for many reasons, including the fact that such glues must be reduced both in temperature and in moisture content before they effectively bond the sheets together and there is no satisfactory drying and cooling means for such glues which will permit high speed production at relatively low manufacturing costs. Moreover, the hot glues form a jell on reduction of temperature, causing them to grab onto the fibers of the paper too quickly, thereby aggravating the problem of maintaining the sheets in proper alignment, i.e., with their holes 26 and 28 in full and direct register.

We have also determined that the conventional animal and dextrin glues are not entirely satisfactory because of the fact that solids are in suspension within the liquid content thereof such that glues of that type are too slow to set up and dry and not conductive to obtaining the rather large number of desired results made possible through use of our present method.

Therefore, the glue to be dispensed from the nozzles 52 is desirably a cold glue that is easy to handle, requiring no heat to maintain it in a fluid condition and requiring no equipment for reduction of the temperature thereof, it being contemplated that the glue emanating from the nozzles 52 be at room temperature. In this connection we prefer to use an emulsion having a polyvinyl base with a water content of approximately 40%, including the usual plastercizers, and having the polyvinyl acetate solids emulsified therein, as distinguished from dextrin and animal solutions, wherein the solid particles are in ordinary suspension.

Depending upon the base resin, such glues tend to set rather quickly, particularly upon application of pressure, and thereupon are capable of rapid evaporation of their moisture content. Therefore, as soon as the sheets 20 and 24 come into engagement with the glue lines 36 thereabove, such glue tends to immediately grab onto the fibers of the papers and hold them against slippage relatively, but, by the same token, the selected glue is characterized by the fact that sufficient relative slippage between the sheets 16, 20 and 24 is permitted to maintain the holes 26 and 28 aligned and in register while the remaining steps of the process are carried out.

We also prefer to use pulsed microwave energy to generate internal heating of the glue in a concentrated area which may be confined to approximately ⅛ inch wide or less, thereby causing rapid drying and bonding in the stub construction 32 of continuous as well as snap-apart business forms and stationery. Such microwave internal heating in a concentrated area, as distinguished from induced heating over the entire form area, can be produced through use of a magnetron 60 in which the flow of electrons is controlled by an externally applied magnetic field to generate power at microwave frequencies, such very short electromagnetic waves normally being between approximately 100 centimeters and one centimeter in wave length. Such microwaves, in the vicinity of about 2,400 megacycles, are capable of developing tremendous heat and energy, combined in a relatively small space conducted to the exact zone where heat is needed without introduction of undesired heat into those areas of the sheets where the paper and the carbon might be adversely affected, which has been a detriment to optimum results in all previous systems and methods. Accordingly, the wave guide section 62 of the magnetron generator 60 need not exceed more than approximately four feet in length thereby reducing the drying time to a minimum and permitting high speed production. Such internal heating of the glue to evaporate its moisture content prevents damage to the carbon papers 18 and 22 because their oil based carrying agent will not dry out, nor will there be any spoilage of the paper sheets 16, 20, or 24 by burning or scorching.

It has been found advisable also to use pinned drums, rollers or the like 64 at the drying section to move the superimposed sheets simultaneously along the section 62 and maintain them in proper alignment until such time as the glue is completely dry and full and effective bonding of the sheets together has been effected. As above mentioned, the glue which we have selected permits sufficient slippage of the sheets relatively to cause such proper alignment during first contact of the paper parts. Yet, because of the fast setting characteristics of the glue after water has been removed by microwave created heat, the complete, firm and final fastening of the sheets one to another is made possible during the very short period during which the glue lines 36 are subjected to the generator 60.

From the dryer 60 the sheets are advanced through a perforating head 64 to produce the transverse lines of perforation 14. It is of course possible to interpose the head 64 ahead of the dryer 60, but the step of perforating tends to shift the sheets out of alignment and we have, therefore, found it to be preferable to have complete and firm bonding of the sheets prior to subjecting them to the perforator 64.

Figure 6:
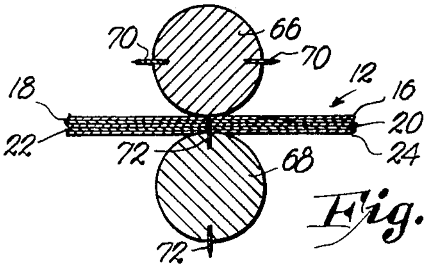
FIG. 6 is a fragmentary, longitudinal cross-sectional view through the forms showing one type of cross perforator.

In FIG. 6 of the drawings there is illustrated upper and lower perforating drums 66 and 68 provided with diametrically opposed perforating blades 70 and 72 respectively and timed in their rotation such as to alternately perforate the sheets along the lines 14 from the top and from the bottom. Such alternating function of the drums 66 and 68 of the head 64 is advantageous from the standpoint of proper folding in folder section 74 along the lines 14 to produce the pack 10 as shown in FIG. 3. Alternatively, the drum 68 could be in the form of an anvil with all of the blades on the drum 66 such that formation of the lines 14 would be from the top only, but such arrangement causes a back fold on every other cross perforation which limits the number of superimposed sheets to no more than eight and, in turn, is less desirable than drums of the kind illustrated at 66 and 68 in FIG. 6 of the drawing.

It is now apparent that with the sheets 16, 20 and 24 fully and properly bonded together along the glue lines 36, there will be no separation or tenting at the lines of fold along the perforation lines 14, eliminating, therefore, the problems of jamming and other malfunctions which are quite common in the use of a product of this nature in printing machines and other equipment.

In order to accomplish the desired results as hereinabove initially outlined, it is also extremely important that the glue lines 36 be very narrow and of minimal thickness for many reasons. By providing for only sufficient surface impregnation of the paper fibers such as to effect good bonding, the stub area 32 will not become unduly rigid and inflexible along the glue lines 36, not only making it possible to form the sheets into a compact stack 10, but reducing problems incident to the feeding of the forms through computerized printers and the like. Such minimum bulkiness at the glue lines 36 is made possible by applying the glue continuously and uniformly and by selection of a glue nozzle, as well as a drying process, which will eliminate zones of separation along the glue lines 36 and eliminate formation of dried glue crystals, lumps and the like which are incapable of holding the sheets properly bonded together.

It is to be understood also that the glue line 36 may be produced along more than one longitudinal edge of the forms 12; in certain instances it is desirable or necessary to duplicate the glue applying and drying steps along that edge of the forms 12 having the openings or holes 26 therein. The gluing method is also fully adaptable for use in making various types of snap-out forms, as above indicated. Moreover, it is not necessary to utilize the stub feature 32 with the line of perforations 30 in the manner and for the purpose above described.

Concentrated heating along the glue lines 36 is important because it avoids damage to the carbons 18 and 22. In some instances, processed carbons are used having the same width as the sheets 16, 20 and 24 with the holes 26 and 28 also passing through the carbon sheets. However, the marginal edges are kraft paper, not carbonized; hence, even in such instances the adjacent carbon areas will not be damaged.

The gluing process also affords a complete and proper method of fastening the entire set of forms together by the application of the glue lines to the face and back of paper sheet 20, whereby the glue lines are applied so as to fasten the paper to the carbon below, and this carbon in turn is fastened to the sheet below it, thus accomplishing the manufacture of extremely flexible forms which will allow the complete set to pass easily around the platen of a typewriter or a computer printer which utilizes a small round platen and, therefore, is more prone to jam when a bulky form is passed over and around the small platen. This is to be done by the use of processed carbon paper with the holes 26 and 28 also passing through the carbon sheets, thus allowing the pins on the drums to function in their capacity of moving the sheets forward while the gluing and drying functions are being performed. Under special conditions where a wider stub is permissible, this form of construction can be effected without the use of the holes 26 and 28 in the carbon, by moving the carbon away from the edge and applying the glue and microwave heat to the form on the inside areas of the pin feed device.

Important also is the fact that the gluing process may be accomplished without the necessity of using slow speed zigzag type folders with tucker blades, thereby enabling the use of high speed folding equipment such as, but not limited to, spiral and/or air jet or vacuum type folders operating at their fullest rated speed and capacity.

While it is preferred that the adhesive appear in the form of a continuous, elongated, narrow, thin line, it is also possible to accomplish spot gluing or interrupted lines. In certain instances it may be desirable, for example, to omit the glue at the lines of fold.

DESCRIPTION OF FIGS. 8–11

The apparatus 76 illustrated in FIGS. 8–11 is designed to perform the same assembling, gluing, and folding operations as the equipment of FIGS. 1–7, with the additional capability of cross-perforating the sheets being processed at variable locations along the sheets. As before, the finished product is a continuous, multileaved web having, for example, individual sections 78 which may be alternately folded in opposite directions along perforation fold lines 80 to produce a finished pack 82. In contrast to the web produced by the equipment of FIGS. 1–7, however, the web produced by apparatus 76 has any selected number of perforation tear lines 84 located between an adjacent pair of fold lines 80 to subdivide each section 78 into two or more end-to-end articles 86 which retain the lines 80 as the fold lines for producing the pack 82.

Apparatus 76 includes a collating and gluing portion 88 for bringing the various sheets or leaves of the web into superimposed, aligned relationship with one another in the manner of the collating mechanism of FIGS. 1 and 2 and for applying a precisely controlled line of adhesive to the sheets to bond them in the manner hereinbefore described. The microwave dryer 90 downstream from the collating and gluing portion 88 receives the web with the adhesive applied to the sheets thereof and completes the special drying and curing of the adhesive as set forth above for ultimate delivery of the web to the folder unit 92 at the left end of the apparatus 76 viewing FIGS. 8 and 9.

Interposed between the microwave dryer 90 and the folder unit 92 is a special perforating component 94 having supporting framework structure broadly denoted by the numeral 96 which carries a pair of individual perforating heads 98 and 100 which are spaced apart along the path of travel of the web of sheets. The head 98 is removably mounted upon frame 96 by mounting bolts 102 and has a pair of opposed, rotary drums 104 and 106, each capable of carrying one or more elongated, peripherally disposed perforating blades 108. As shown in FIG. 10, the perforating blades 108 of drums 104 and 106 are angularly offset with respect to one another in diametrically opposed relationship so that the blades 108 engage the web moving between drums 104 and 106 at spaced intervals and from opposite directions to produce the fold lines 80 as earlier described with regard to FIGS. 1–7.

The perforating head 100 is also removably mounted on frame 96 by a plurality of bolts 110 and includes a rotary drum 112 similar to drums 104 and 106. Drum 112 carries a predetermined number of perforating blades 114 which cooperate with a rotary anvil 116 below drum 112 to produce perforation tear lines 84.

For reasons which will hereinafter appear, whether or not perforating head 100 is located upstream or downstream from head 98 is not critical to the present invention, although for illustration purposes head 100 has been shown in an upstream relationship to head 98. Moreover, in upstream relationship to both heads 98 and 100 is a third perforating head 118 interposed between the microwave dryer 90 and the collating and gluing portion 88. Perforating head 118 has at least one drum assembly and opposing anvil (not shown) as in the case of head 100, but alternatively, may be provided with a pair of drum assemblies as in the case of head 98.

In accordance with the principles of our present invention the heads 100 and 118 may be disabled by disconnecting their drive connections so that the head 98 may function alone. It is to be understood that the drums 104 and 106 of head 98 may carry any number of perforating blades 108 and may be of any selected diameter in order to produce perforation fold lines 80 at selected intervals along the web of sheets. By way of example, it may be desired to fold the web at 11 inch intervals, whereupon the head 98 may have drums 104 and 106 which are 22 inches in circumference with the blades 108 diametrically opposed to one another so as to produce fold lines 80 at 11 inch intervals. If it is desired to produce a web having fold lines 80 at, for example, 7, 8½, 10½or 12 inch intervals, then it is but necessary to release the bolts 102 and replace the head 98 with one having the appropriately sized drums.

It is contemplated that once a head 98 has been selected which has the appropriately sized drums 104 and 106, many job orders requiring perforations only along the points of fold without intermediate cross-perforations, may be handled on a day-to-day basis. However, should an order be received which calls for specially sized business forms, for example, which are smaller in size than the fold intervals, the head 100 may be placed in operation to provide the necessary tear lines 84 while retaining the required fold intervals defined by fold lines 80.

For example, if the fold line interval is 11 inches with the drums 104 and 106 being 22 inches in circumference, a single tear line 84 may be produced at 5½ inches between each pair of fold lines 80 by using a head 100 having a drum 112 which is 22 inches in circumference and has perforating blades 114 diametrically opposed to one another and each offset 90° relative to the blades 108 of head 98. Should the required size of each article 86 be less than 5½ inches while maintaining an 11 inch fold interval, the drum 112 of head 100 may be provided with such additional blades 114, angularly offset in the appropriate manner, as may be required to produce the desired number of tear lines 84 between each pair of fold lines 80.

By virtue of the variable number of blades 114 which may be carried by drum 112 and the removable mounting feature for each of the heads 98 and 100, a multitude of spacing combinations may be obtained for the fold lines 80 and the tear lines 84 so that virtually all size requirements may be accommodated. Moreover, and perhaps more importantly, is the fact that such size accommodations may be made with a minimum of down-time, particularly in those situations in which only an additional number of tear lines 84 are required on an existing fold interval. In these situations, it is but necessary to place the head 100, which has prior to this time been idle, in operation along with the heretofore operating head 100. Furthermore, even in those situations which require a substitution of new heads for the heads 98 and 100, the removal and replacement process may be quickly and easily effected by virtue of the releasable mounting bolts 102 and 110 for the heads.

The present invention allows the economical interruption of a production run to insert a priority customer order requiring, for example, a different size head, i.e., change from a 22 in. head to a 17 in. head without disturbing the 22 inch head setup, and then allows return to the 22 inch head after the priority order is complete without any further time loss. To our knowledge this is the first time a machine has been designed to accomplish this. There have been other attempts to solve this rapid changeover problem, using rotating multi-head systems, or variable gear ratio systems, none of which has been entirely successful because of the extreme difficulty of obtaining close enough tolerance, and the problem that after some months of use the wear on the components produces a degree of variation that cannot be tolerated. This new invention accomplishes the desired rapid change-over, maintains the desired accuracy, eliminates the problem of variation because of wear, and requires no more maintenance than the older systems that do not provide the required versatility.

It is to be further pointed out that the folding of the web along lines 80 in opposite directions may be facilitated by producing the tear lines 84 from one direction only instead of producing them from opposite directions as is the case with every other fold line 80. Thus, only one drum 112 is provided with perforating blades 114 while the anvil 116 is devoid of such blades and serves only to cooperate with blades 114 in producing the tear lines 84. Apparently, the practice of producing the tear lines 84 from only one direction means that in many instances, the web would have to fold back "against the grain" of the tear line 84 in order to fold into the pack 82 and such against the grain folding offers more resistance than the reverse folding at line 80.

In certain situations where the heads 98 and 100 are not appropriate for use because of the special fold intervals required, the head 118 may be removed from its disabled condition and placed in use in lieu of heads 98 and 100, thus affording an additional cross-perforating station for added flexibility in production.

Having thus described the invention, what is claimed as new and desired to be secured by Letters Patent is:

1. In a method of producing successive lengths of cross-perforated, multi-leaved webs, each perforated at preselected, uniform intervals varying substantially from those of another length, the steps of:

drivingly engaging a multi-leaved web at fixed intervals along the length of the latter and thereby advancing the web along a path of travel past a series of separate, individually operable perforating heads, each capable of perforating a web at uniform intervals different from those possible with another head;

operating at least one head selected in accordance with the perforation interval to be produced on a particular web while maintaining the other heads disabled until the required length of web has been perforated;

disabling said one head;

maintaining the web drivingly engaged at the same fixed intervals and reinstituting advancement of the web; and operating another head selected in accordance with the next perforation interval to be produced while maintaining said one head and the remaining heads disabled until the next required length of web has been perforated.

2. In a method as claimed in claim 1, wherein is provided the additional steps of disabling said another head and operating a third head to produce the next length of perforated web.

3. In a method as claimed in claim 1, wherein is provided the additional steps of disabling said another head and reactivating said one head after completing the second length of web to produce a new length of web having perforation intervals identical to those of the first produced web.

* * * * *